US006299978B1

(12) United States Patent
Sarma

(10) Patent No.: US 6,299,978 B1
(45) Date of Patent: Oct. 9, 2001

(54) SEMICONDUCTIVE POLYOLEFIN COMPOSITIONS AND CABLES COVERED WITH THE SAME

(75) Inventor: Haridos Sarma, Brampton (CA)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 09/524,022

(22) Filed: Mar. 13, 2000

Related U.S. Application Data

(60) Provisional application No. 60/127,392, filed on Apr. 1, 1999, now abandoned.

(51) Int. Cl.⁷ .............................. B32B 15/00; B05D 5/12; C08L 31/04
(52) U.S. Cl. .................... 428/379; 252/511; 428/383; 428/372; 174/110 PM; 174/120 SR; 174/120 SC; 524/524; 427/118
(58) Field of Search ............................. 252/511; 524/524; 428/372, 379, 383; 174/110 PM, 120 SR, 120 SC; 427/117, 118

(56) References Cited

U.S. PATENT DOCUMENTS

| 4,370,517 | * | 1/1983 | Soma et al. | 174/74 |
| 4,612,139 | | 9/1986 | Kawasaki et al. | 252/511 |
| 4,801,766 | | 1/1989 | Aida et al. | 174/120 |
| 4,909,960 | | 3/1990 | Watanabe et al. | 252/511 |
| 5,091,467 | * | 2/1992 | Beers | 525/510 |
| 5,153,262 | * | 10/1992 | Beers | 525/57 |
| 5,352,289 | | 10/1994 | Weaver et al. | 106/476 |
| 5,492,760 | | 2/1996 | Sarma et al. | 428/378 |
| 5,556,697 | * | 9/1996 | Flenniken | 428/323 |
| 5,719,218 | | 2/1998 | Sarma | 524/100 |

FOREIGN PATENT DOCUMENTS

375828 * 7/1990 (EP) .
WO00/60615 * 10/2000 (WO) .

* cited by examiner

Primary Examiner—Cynthia H. Kelly
Assistant Examiner—J. M. Gray

(57) ABSTRACT

A semi-conducting composition for use as conductor shield in extruded coatings on high voltage electrical cables, and the resultant cables. The composition consists essentially of (a) a polymeric component of a blend of 0–99% by weight of polyolefin and 1–100% by weight of a ter-polymer of ethylene/ vinyl acetate (vinyl alcohol), (b) conducting carbon black, and (c) an antioxidant.

15 Claims, No Drawings

SEMICONDUCTIVE POLYOLEFIN COMPOSITIONS AND CABLES COVERED WITH THE SAME

This application claims benefit of provisional No. 60/127,392 filed Apr. 11, 1999.

FIELD OF THE INVENTION

The present invention relates to compositions suitable for use as a conductor shield in multi-layered extruded coatings on power cables that are intended to provide protection for the power cable in use, and especially to such coatings that extend the life of the cable when it is exposed to moisture. In particular, the present invention relates to such compositions that are based on polyolefins, conductive carbon blacks and a ter-polymer of ethylene, vinyl acetate and vinyl alcohol. Such ter-polymers may be referred to as EVA(OH) ter-polymers.

BACKGROUND OF THE INVENTION

High voltage power cables have multiple coatings that are extruded onto the conductor to provide protection and to extend the life of the power cable. In particular, high voltage power cables have an inner semiconducting layer (referred to as conductor shield) surrounding the conductor, an intermediate layer of cross-linked polyethylene insulation and an outer semiconducting layer surrounding the insulation layer (referred as insulation shield). The purpose of the inner semiconducting layer is to relax or relieve the heterogeneous electrical stress attributed to irregularities in the conductor and also to increase the adhesion between the conductor and insulation. The external semiconducting layer, which could be either a bonded layer or a strippable layer, homogenizes the electrical stress on the insulation surface.

The semiconducting layer, which is also known as the conductor shield, is typically formed from ethylene based polymers e.g. ethylene/vinyl acetate or ethylene/ethyl (or butyl) acrylate or ethylene/alkene copolymers. The ethylene based polymer is blended with conducting carbon black e.g. furnace black or acetylene black, appropriate antioxidants and an organic peroxide cross-linking agent.

The level or amount of the trace elements (impurities) in the carbon black, conductor shield asperities at the insulation interface and the additives in the composition all tend to influence the useful life of the insulation.

A common cause of reduction in the life of an extruded power cable is the formation of so-called water trees, which are believed to result from the presence of water and water-soluble ions, such as sulphur and metallic cations, within the conductor shield. Carbon blacks with low sulphur and cation impurity levels are advantageous for use in long-life underground cables. Acetylene black manufactured from pure acetylene is considered to be the industry standard for a clean carbon black.

The asperities at the conductor shield—insulation interface tend to increase localized electrical stress on the insulation and hence reduce the life of the cable. The actual size and number density of these asperities can be reduced so as to increase the cable life, by choosing appropriate manufacturing conditions or carbon black of appropriate morphology and cleanliness characteristics, or both. U.S. Pat. No. 5,352,289 describes a furnace carbon black having an ash level and sulphur content less than or equal to 50 ppm as being suitable for cable applications. However, it is also known that, under optimum processing conditions, furnace blacks of low ash and grit content exhibited a smoothness quality comparable to acetylene black.

Some of the low molecular additives conventionally added to highly-filled conductor shield compositions have also been found to be advantageous in increasing or extending the performance of extruded power cables. For instance, U.S. Pat. No. 4,909,960 describes one such composition containing a low molecular weight polyethylene with an average molecular weight of 1000–4000. U.S. Pat. No. 4,612,139 describes the use of polyethylene glycol having molecular weight of 1000–20,000 as imparting advantages in retarding water tree growth. U.S. Pat. No. 4,801,766 describes use of a conductor shield composition containing n-vinyl carbazole to increase the breakdown strength of the cable.

U.S. Pat. No. 5,719,218 discloses addition of an ethylene/vinyl acetate(vinyl alcohol) ter-polymer to the intermediate layer of insulation, to improve resistance to moisture induced degradation.

Other methods to impart to the insulation an intrinsic resistance to the growth of water trees are known. However, there remains a need for an improved conductor shield composition which, when laid (layered) with a conventional non-tree retardant insulation, will extend cable life.

SUMMARY OF THE INVENTION

It has now been found, unexpectedly, that the life of a cable having an insulation layer of cross-linked polyethylene can be extended by adding ethylene/vinyl acetate(vinyl alcohol) ter-polymer to the composition used to form the conductor shield.

Accordingly, an aspect of the present invention provides a semiconducting composition for use as conductor shield in extruded coatings on high voltage electrical cables, said composition consisting essentially of (a) a polymeric component of a blend of 0–99% by weight of polyolefin and 1–100% by weight of a ter-polymer of ethylene/ vinyl acetate (vinyl alcohol), (b) conducting carbon black, said carbon black containing less than 50 ppm of each of ash, ions and sulphur, and (c) an antioxidant.

A further aspect of the present invention provides a high voltage electrical cable coated with a conductor shield composition consisting essentially of (a) a polymeric component of a blend of 0–99% by weight of polyolefin and 1–100% by weight of a ter-polymer of ethylene/vinyl acetate (vinyl alcohol), (b) conducting carbon black, said carbon black containing less than 50 ppm of each of ash, ions and sulphur, and (c) an antioxidant, and over-coated with cross-linked polyolefin composition.

An additional aspect of the present invention provides a method of providing a coating on high voltage electrical cable comprising:

(a) extrusion coating the conductor of such cable with a conductor shield composition consisting essentially of (a) a polymeric component of a blend of 0–99% by weight of polyolefin and 1–100% by weight of a ter-polymer of ethylene/ vinyl acetate (vinyl alcohol), (b) conducting carbon black, said carbon black containing less than 50 ppm of each of ash, ions and sulphur, and (c) an antioxidant;

(b) extrusion coating a cross-linkable polyolefin composition over said conductor shield composition; and (c) effecting cross-linking of said cross-linkable polyolefin composition.

In an embodiment of the method of the invention, a protective coating is extruded over said cross-linkable coating prior to effecting said cross-linking.

DETAILED DESCRIPTION OF THE INVENTION

An aspect of the present invention provides a semi-conducting composition for use as conductor shield in extruded coatings on high voltage electrical cables. The composition consists essentially of a polyolefin, conducting carbon black, an antioxidant and a ter-polymer of ethylene/vinyl acetate (vinyl alcohol).

The polyolefin of the semi-conducting composition of the invention may be selected from a wide variety of polyolefins, but must be capable of being blended with the EVA(OH) polymer as described herein. Such polymers include polymers of ethylene and other monomers e.g. polymers generally referred to as polyethylene, including homopolymers of ethylene and copolymers of ethylene with other alpha-unsaturated hydrocarbon monomers, and other ethylene-a olefin copolymers e.g. ethylene/vinyl acetate, ethylene/ethyl acrylate and ethylene/vinyl silane copolymers. The polymers may be manufactured by a variety of techniques known to those skilled in the manufacture of such polyolefins. Examples of processes of manufacture include under high pressure using a tubular or autoclave reactor with any of the known free radical initiators or coordination catalysts, using slurry, solution or gas phase polymerization techniques with coordination catalysts, including the catalysts known as metallocene catalysts and the transition metal catalysts.

Carbon blacks for use in coatings for cables are well known in the art, and include carbon blacks known as acetylene black and furnace black. The carbon black has less than 50 ppm, and preferably less than 30 ppm of each of ash, ion content and sulphur.

The ethylene/vinyl acetate (vinyl alcohol) i.e. EVA(OH), ter-polymer may be obtained by the hydrolysis of ethylene/vinyl acetate copolymer, and especially by hydrolysis of an ethylene/vinyl acetate copolymer having a vinyl acetate content of approximately 20–30% w/w. Hydrolysis of such copolymers is known, and may be achieved by any of the techniques used by those skilled in the art. It is preferred that hydrolysis of the acetate groups to the alcohol groups be effected to a minimum of 38% hydrolysis, on a stoichiometric basis. A preferred amount of hydrolysis is in the range of 40–50%. The preferred minimum concentration of the ter-polymer is 1% with the maximum ranging to 100% by weight, and conversely the polyolefin component of the semi-conducting composition may range from 0–99% by weight.

The composition of the present invention also contains antioxidants, as is known for such compositions in the cable coating art. The coating may also contain organic peroxides, as is known in the art. Other additives which may be employed in the composition include, for example, processing aids, plasticizers, coupling agents, chelating agents and organic tin catalysts.

In a further aspect of the invention, there is providing a method of coating a high voltage cable for protection by extruding the semi-conducting coating of the invention over a conductor cable, and then overcoating with a cross-linkable coating composition. The cross-linkable coating composition is preferably a composition of a polyolefin and organic peroxide or silane cross-linking agent, examples of which are dicumyl peroxide, di(2-tert-butylperoxyisopropyl) benzene, and methoxy silanes. Techniques for effecting cross-linking of such compositions are known and include extrusion in the case of organic peroxide cross-linking agents, and extrusion followed by subjecting to water, steam or high humidity in the case of silane cross-linking agents. Such processes for applying a layer of cross-linkable polyolefin onto a cable and effecting cross-linking are known.

It is believed that addition of the ter-polymer to the semi-conductive composition will permit use of a wide range of hydrolysis and melt index of additives without effecting changes in the insulation characteristics of the insulating layer.

The present invention is illustrated by the following examples.

EXAMPLE I

The semi-conductive shield compositions of the present invention were tested with respect to compliance with the industry standards.

The conductor shield compositions used to test the concept of the present invention are given in Table 1. The compositions were prepared by combining the different components in appropriate proportions as described in Table 1 and using a Buss co-kneader:

The base polymer used in all of these examples was an ethylene/vinyl acetate copolymer with 18–20% w/w vinyl acetate. The melt index of the polymer was 25. An antioxidant with the trade name Agerite D (polymerized 1,2-dihydron 2,2,4-trimethylquinoline) supplied by Van der Built was used for all compositions. An organic peroxide with the trade name Perkadox 14S-FL (di(2-tert-butylperoxyisopropyl) benzene) supplied by Akzo Nobel Chemicals was used to cross-link the conductor shield compositions.

Different grades of furnace carbon blacks were used to illustrate the ageing behaviour of the conventional cross-linked polyethylene insulated cables. The sulphur content in Furnace black #1 was 5000 ppm and that in #2 was <50 ppm. The total ash and ion content in #2 were also less than <50 ppm. Three different binders were used to make the furnace black #2 free flowing for the subsequent compounding of the compositions. Grade 2a used a sucrose binder, Grade 2b used Tween 80 (polyoxyethylene 20 sorbiton monoleate) and Grade 2c with polyethylene glycol of molecular weight 20000. Acetylene black employed in the present example was procured from Denka, Japan.

The ter-polymer EVA(OH) used to demonstrate the beneficial effects of the polymer consisted of 28% vinyl acetate of which 40–45% was hydrolyzed and was supplied by Tosoh.

TABLE 1

Semiconductive Conductor Shield Compositions

| Components* | 1 | 2 | 3 | 4 | 5 | 6 | 7 |
|---|---|---|---|---|---|---|---|
| Ethylene vinyl acetate | 63.6 | 56.8 | 56.8 | 56.8 | 55.8 | 56.8 | 62.6 |
| Agerite D antioxidant | 0.5 | 0.5 | 0.5 | 0.5 | 0.5 | 0.5 | 0.5 |
| Furnace black 1 | 32.0 | — | — | — | — | — | 32.0 |
| Furnace black 2a | — | 42.0 | — | — | — | — | — |
| Furnace black 2b | — | — | 42.0 | — | 42.0 | — | — |
| Furnace black 2c | — | — | — | 42.0 | — | — | — |
| Acetylene black | — | — | — | — | — | 42.0 | — |
| Perkadox 14S-FL | 0.9 | 0.7 | 0.7 | 0.7 | 0.7 | 0.7 | 0.9 |
| Polyethylene wax | 3.0 | — | — | — | — | — | 3.0 |
| EVA(OH) | — | — | — | — | 1.0 | — | 1.0 |

*percentages of components by weight

Enhanced performance was verified by accelerated cable life tests on real size cables as stipulated by the standards.

The tests were conducted in water-filled tanks. A set of twelve test samples consisting of 15 kV rated cables were energized to four times the operating voltage in a series circuit, submerged in water filled tanks, with water inside the conductor strands. Voltage was maintained continuously while the cables were load cycled to a conductor temperature of 90° C. for eight hours each day. The cables were tested to failure and the data analyzed using Weibull statistics. The results of the Weibull statistics are reported as (a) the mean time for 63.5% failure probability and (b) the statistical spread in the data.

It is generally agreed by those skilled in the art that a cable system with an improved test performance i.e. longer time to failure, will also carry over into its field performance reliability and extension of cable life.

Water tree examination was also conducted in the failed test samples to show the benefit of the conductor shield compositions to limit the growth of the water trees at the insulation interface.

Commercially available cross-linkable insulation and insulation shields were used for all test cables.

15 kV cables using the compositions of Table I as conductor shield compounds and commercially-available conventional cross-linked insulation and insulation shield were extruded using a dry cure tandem cable extrusion line. The extruded cables were then tested in water filled tanks as detailed above. The time to failure of the test samples in each series was recorded and analyzed using Weibull statistics. In addition, the last four samples of each series to fail were analyzed for water trees. The results are summarized in Table 2.

TABLE 2

Accelerated Cable Life Test Results for the Runs 1–7

| RUN No. | 1 | 2 | 3 | 4 | 5 | 6 | 7 |
|---|---|---|---|---|---|---|---|
| Weibull $\alpha$ (days to failure) | 66.9 | 96.5 | 120.2 | 151.1 | 172.1 | 68.8 | 98.9 |
| Weibull $\beta$ | 6.15 | 4.33 | 4.82 | 5.17 | 4.79 | 5.58 | 2.52 |
| Largest water tree size at the shield-insulation interface (mil) | 3.5 | 2.5 | 2 | 2.5 | 2.5 | —* | 45 |

*No water trees were observed
Note:
Runs 1–4 and 6 are comparative
Runs 5 and 7 illustrate the invention The results for Run 1 (furnace carbon black 1 with high sulfur and ash content), Run 2 (furnace black 2a with low sulfur and ash content) and Run 6 (acetylene black viz. industry standard for clean carbon black) show that changing the carbon black in the conductor shield composition resulted in no or minimal improvement in the statistical time to failure (Weibull $\alpha$). The actual values obtained in Run 1 and Run 6 were within the statistical variability of the experiments. The value obtained in Run 2 is regarded as being a minimal improvement (24.5%) over that of Run 1. However, the results show a reduction in largest water tree size at the shield—insulation interface, especially for Run 6 where no water trees were observed at the interface of the failed cable materials. This result is believed to be due to the low level of impurities as the presence of impurities in the conductor shield is generally believed to be responsible for the generation of water trees at the interface.

The effect of the binder is seen from the results of the tests of the compositions of Run 2 (sucrose binder), Run 3 (Tween 80 binder) and Run 4 (PEG binder), all of which utilize furnace black 2. Increases of 24.5% and 56.6% in Weibull $\alpha$ values were observed with Tween 80 and PEG binders, respectively, compared to sucrose. In comparison to Run 1, which used conventional furnace carbon black 1, the percentage improvements achieved by compositions with furnace black 2 are 44.2% with Run 2, 79.7% with Run 3 and 125% with Run 4. The results show that the binders tested did not have any effect on the largest size of water trees.

The improvement obtained by use of compositions containing the terpolymer additive EVA(OH), according to this invention, is demonstrated by comparing the results of Runs 1 and 7, and of Runs 3 and 5. With the same reference carbon black in composition, the addition of EVA(OH) resulted in 47.8% improvement in one instance (Run I v Run 7 viz. furnace black 1 with high sulfur and ash content) and 43.2% improvement in the other instance (Run 3 and Run 5; furnace black 2b with low sulfur and ash content and Tween 80 binder). Thus, in both instances, an equivalent increase in the time-to-failure was achieved by addition of 1% (by weight) of EVA(OH) to the conductor shield composition.

The increase in the largest water tree size observed between Run 1 and Run 7 is believed to be attributed to the impurities associated with furnace black 1 used in these compositions.

Thus, the examples demonstrate that addition of EVA (OH) ter-polymer results in an unexpected increase in the time to failure of the compositions.

What is claimed is:

1. A semi-conducting composition for use as conductor shield in extruded coatings on high voltage electrical cables, said composition consisting essentially of (a) a polymeric component of a blend of 0–99% by weight of polyolefin and 1–100% by weight of a ter-polymer of ethylene/ vinyl acetate (vinyl alcohol), (b) conducting carbon black, said carbon black containing less than 50 ppm of each of ash, ions and sulphur, and (c) an antioxidant.

2. The composition of claim 1 in which the polyolefin is ethylene/vinyl acetate copolymer.

3. The composition of claim 1 in which the polyolefin is a polyethylene.

4. The composition of claim 1 in which the ethylene/vinyl acetate (vinyl alcohol) copolymer has 20–30% w/w of vinyl acetate, and at least 38% of the vinyl acetate groups have been hydrolysed.

5. The composition of claim 1 in which the carbon black has less than 30 ppm of each of ash, ions and sulphur.

6. A high voltage electrical cable coated with a conductor shield composition consisting essentially of (a) a polymeric component of a blend of 0–99% by weight of polyolefin and 1–100% by weight of a ter-polymer of ethylene/ vinyl acetate (vinyl alcohol), (b) conducting carbon black, said carbon black containing less than 50 ppm of each of ash, ions and sulphur, and (c) an antioxidant, and over-coated with cross-linked polyolefin composition.

7. The cable of claim 6 in which the polyolefin is ethylene/vinyl acetate copolymer.

8. The cable of claim 6 in which the polyolefin is a polyethylene.

9. The cable of claim 6 in which the ethylene/vinyl acetate (vinyl alcohol) copolymer has 20–30% w/w of vinyl acetate, and at least 38% of the vinyl acetate groups have been hydrolysed.

10. The cable of claim 6 in which the carbon black has less than 30 ppm of each of ash, ions and sulphur.

11. A method of providing a coating on high voltage electrical cable comprising:
   (a) extrusion coating the conductor of such cable with a conductor shield composition consisting essentially of (a) a polymeric component of a blend of 0–99% by weight of polyolefin and 1–100% by weight of a ter-polymer of ethylene/ vinyl acetate (vinyl alcohol), (b) conducting carbon black, said carbon black containing less than 50 ppm of each of ash, ions and sulphur, and (c) an antioxidant;

(b) extrusion coating a cross-linkable polyolefin composition over said conductor shield composition; and (c) effecting cross-linking of said cross-linkable polyolefin composition.

12. The method of claim 11 in which a protective coating is extruded over said cross-linkable coating after effecting said cross-linking thereof.

13. The method of claim 11 in which the polyolefin is ethylene/vinyl acetate copolymer.

14. The method of claim 11 in which the polyolefin is a polyethylene.

15. The method of claim 11 in which the carbon black has less than 30 ppm of each of ash, ions and sulphur.

* * * * *